United States Patent [19]

McCandless

[11] 4,253,435
[45] Mar. 3, 1981

[54] DIESEL ENGINE AND PISTON ASSEMBLY THEREFOR

[75] Inventor: James C. McCandless, Naperville, Ill.

[73] Assignee: International Harvester Company, Chicago, Ill.

[21] Appl. No.: 15,673

[22] Filed: Feb. 26, 1979

Related U.S. Application Data

[63] Continuation-in-part of Ser. No. 880,417, Feb. 23, 1978, abandoned.

[51] Int. Cl.³ .............................................. F02F 3/02
[52] U.S. Cl. .................................. 123/193 P; 92/61; 92/208; 277/216
[58] Field of Search .................. 92/61, 68, 73, 208; 123/193 P; 277/216; 60/605

[56] References Cited

U.S. PATENT DOCUMENTS

| 2,072,623 | 3/1937 | Illmer . | |
| 3,007,302 | 11/1961 | Vincent | 60/605 |
| 3,463,057 | 8/1969 | Packard . | |
| 3,623,463 | 11/1971 | De Vries | 123/193 P |
| 3,667,443 | 6/1972 | Currie . | |
| 3,738,231 | 6/1973 | Zurner | 92/159 |
| 4,058,981 | 11/1977 | Henson | 60/605 |
| 4,111,104 | 9/1978 | Davison, Jr. | 123/193 P |

OTHER PUBLICATIONS

Society of Automotive Engineers, Inc., "Small Bore Diesel Engine . . . Control", Sep. 8–11, 1975, pp. 1–12.
"Powerplant Components and Accessories", SAE Handbook 1977, Society of Automotive Engineers, Inc., pp. 25.35–25.37.
"Engine Specifications for 3406 Diesel Truck Engine", Caterpillar Tractor Company, Sep. 1974, p. 26.
"New Developments in Piston Rings for the Modern Diesel Engine", Soc. of Automotive Engineers, Sep. 1975, pp. 1–30.

Primary Examiner—Abraham Hershkovitz
Attorney, Agent, or Firm—Dennis K. Sullivan; Neal C. Johnson; F. David AuBuchon

[57] ABSTRACT

An automotive diesel engine is provided with pistons which carry two compression rings and an oil control ring in the conventional manner, the cold end clearance of the second compression ring being greatly exaggerated compared to the cold end clearance of the top compression ring and the annulus defined by the second land of the piston, the two compression rings and the engine cylinder wall having an empirically determined volume, preferably in the range of about 0.12 cubic inches to about 0.35 cubic inches. The top land of the piston is preferably set back to provide exaggerated diametrical clearance with the cylinder wall.

9 Claims, 5 Drawing Figures

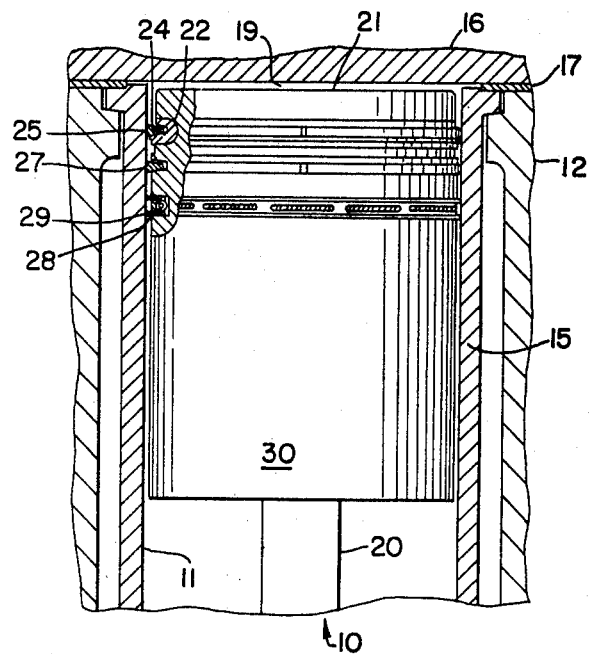
FIG-1-
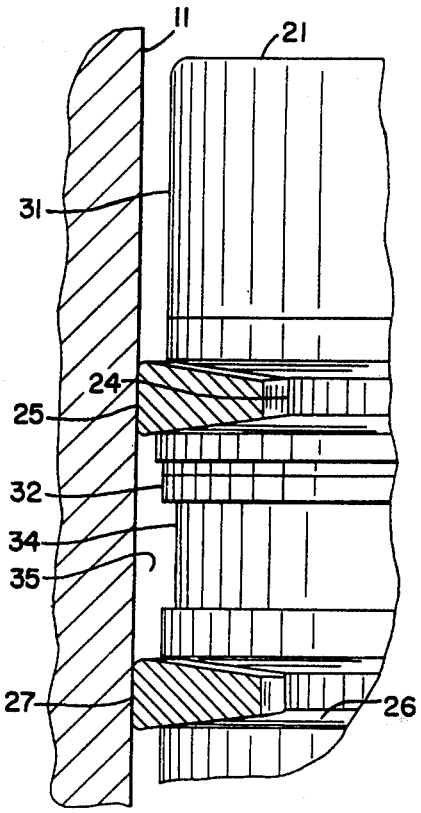
FIG-2-
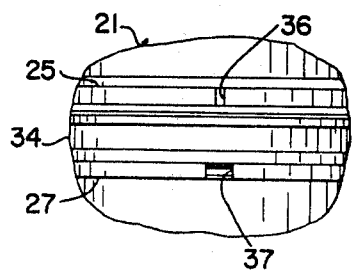
FIG-3-

DIESEL ENGINE AND PISTON ASSEMBLY THEREFOR

CROSS REFERENCE TO RELATED APPLICATION

This application is a continuation-in-part of commonly assigned application Ser. No. 880,417, filed Feb. 23, 1978 now abandoned.

BACKGROUND OF THE INVENTION

This invention relates to automotive diesel internal combustion engines and, more particularly, to improvements in the design of the pistons and piston rings therefor for the purpose of reducing the rate of lubricating oil consumption and deterioration, both initially and over extended periods of operation.

Conventional pistons used in automotive diesel engines generally are provided with two compression rings and one oil ring. Such a piston is disclosed in U.S. Pat. No. 3,463,057 to Packard et al, which is further provided with an exaggerated clearance between the top land of the piston and the cylinder wall. In some cases where the Packard et al. piston has been used, dramatic improvements in oil consumption and deterioration have been noted. This is believed to be due to the elimination of hard carbon deposits on the top land which apparently prevent the combustion gas pressure from communicating with the upper side of the top ring and sealing it against the bottom side of its groove in the piston and against the cylinder wall. It has been noted, however, that even when conventional pistons are provided with this exaggerated clearance, acceptable oil control does not result in all cases. Moreover, even when the initial rate of oil consumption is acceptable it may increase, in some cases drastically, as a function of operating time.

It is believed that with conventional two compression ring pistons, the gas pressure below the top compression ring exceeds the pressure above the top ring during a portion of the expansion cycle. This pressure inversion causes the top ring to be lifted or blown off its sealing surface, i.e., the bottom side of the piston top ring groove, allowing trapped oil and combustion gas to flow upward around the back of the ring onto the top land of the piston which causes the formation of hard carbon deposits thereon and unnecessary oil consumption. The top land carbon deposits then produce further increases in the oil consumption rate as the operating time increases.

Accordingly, it is the object of the invention described and claimed herein to provide an automotive diesel engine with an improved piston and piston ring assembly wherein the seating behavior of the top ring is markedly improved by the substantial elimination of the above-mentioned pressure inversion for the purpose of improving lubricating oil control initially and over a long period of operation.

This and other objects of the invention as will hereinafter become apparent, are specifically met in an automotive diesel engine having otherwise conventional pistons, including a moderate degree of top land setback, carrying two compression rings and one oil control ring wherein the second compression ring is provided with a cold end clearance or compressed ring gap greatly exaggerated compared to the cold end clearance of the top compression ring, preferably in a ratio of at least 3.0 to 1. The annulus defined by the compression rings, the piston second land, and the cylinder wall has an empirically determined volume as will be explained hereinafter, preferably being within the range of about 0.12 cubic inches to about 0.35 cubic inches. The invention has particular application to turbocharged diesel engines although it is applicable to naturally aspirated engines as well.

In the past, others have provided diesel engine pistons with a circumferential groove between the top and second compression ring. Such is illustrated in Zurner U.S. Pat. No. 3,738,231. A similar groove having a volume within the above-stated limits may be found commercially in pistons used in the 3406 DI-T diesel engine manufactured by the Caterpillar Tractor Company. Whatever the purpose of these grooves, laboratory testing has indicated that some improvement in the amount of hard carbon deposit formation on the piston top land and in oil control can be obtained with a groove of appropriate volume in a piston having a moderate amount of top land setback.

To Applicant's knowledge, no one has previously provided a diesel piston with a ring belt having two compression rings wherein the cold end clearance of the second ring is considerably exaggerated compared to the cold end clearance of the top ring. Such represents a major departure from previous practice wherein engine designers for years have strived to minimize ring end clearances in an effort to cut down on gas leakage. The second ring minimum end clearance of the aforementioned Caterpillar 3406 DI-T engine is about 1.66 times the top ring minimum end clearance which is the largest ratio of which Applicant is aware. Generally speaking, however, the industry practice has been to provide second ring minimum end clearance in the range of 0.8 to 1.5 times the minimum top ring end clearance. Indeed, in Standard No. SAE J929, "Piston Rings and Pistons" recommended by the Society of Automotive Engineers (1977 SAE Handbook), no differentiation is made between recommended end clearances for top and second compression rings. Testing has shown, however, that if the second ring cold end clearance is greatly enlarged compared to cold end clearance of the top ring, some improvement in top land hard carbon deposit formation can be obtained.

It is, however, in the application of both of these design modifications, that is, an empirically optimized second land annulus volume and an exaggerated second ring cold end clearance, to a conventional two compression ring piston having a moderate amount of top ring setback that a dramatic improvement in control of top land hard carbon deposits and in oil control can be obtained which is considerably greater than the combined results of employing these parameters separately. Top land hard carbon deposit formation has been all but eliminated and initial lubricating oil consumption has been significantly reduced. Additionally, whereas many engines employing conventional piston assemblies experience significant increases in lubricating oil consumption as a function of operating time, engines employing this invention experience virtually no significant deterioration in the rate of oil consumption over periods of operation as long as 5000 hours. Further, the degree of lubricating oil contamination is significantly reduced, thereby allowing the extension of the interval between changes of the lubricating oil. Additionally, wearing of the second ring groove bottom side due to pounding is reduced by such an amount that the intervals between overhauls of some engines, particularly those wherein the second ring groove of the piston is machined in the aluminum alloy piston rather than in a cast iron insert, are substantially increased. Also wear of the top side of the top ring is virtually eliminated.

BRIEF DESCRIPTION OF THE DRAWINGS

Other objects and advantages of the invention will become more apparent upon reading the detailed description of the preferred embodiment and upon reference to the drawings in which:

FIG. 1 is a longitudinal sectional elevation of a diesel engine cylinder showing a piston assembly embodying the present invention;

FIG. 2 is an enlarged view partly in section of the interface between the piston assembly of FIG. 1 and the cylinder wall;

FIG. 3 is an enlarged exaggerated view of the end gaps of the top and second compression rings of the piston of FIG. 1;

DETAILED DESCRIPTION OF THE PREFERRED EMBODIMENT

Figure 4:
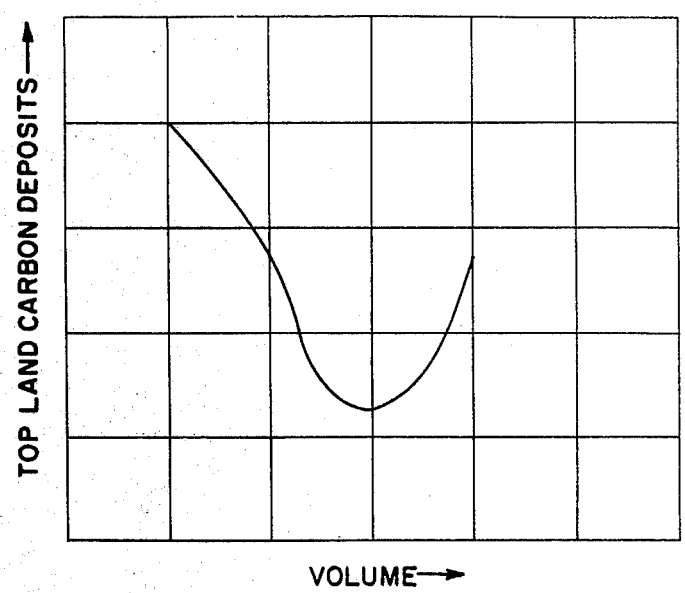
FIG. 4 is a graph illustrating the effect of varying the volume of the second land annulus of the piston of FIG. 1 on the formation of hard carbon deposits on the top land of the piston.

Referring now to FIG. 1, there is shown an exemplary power cylinder generally designated 10 of an otherwise conventional (and thus not illustrated) turbocharged four cycle diesel engine of the automotive type, that is, an engine which is generally used in vehicles. Such engines usually have a cylinder bore diameter in the range from three inches to eight inches. The piston and piston ring arrangement and dimensional relationships described hereinafter are intended for use in this environment.

The power cylinder 10 comprises a cylinder liner 11 fitted in the block 12 of the engine, the liner 11 slidably receiving a piston assembly 15 constructed in accordance with the present invention. The outer end of the cylinder liner 11 is enclosed by a conventional cylinder head 16 secured against the liner and block and sealed by a head gasket 17 to define, with the upper side of the piston assembly 15, a combustion chamber 19. The piston assembly 15 is connected in the usual manner to the engine crankshaft (not shown) by connecting rod 20.

The piston assembly 15 comprises a piston 21 which, except for the ring belt area is of generally conventional design for automotive diesel engines, comprising a trunk type piston constructed of cast or forged aluminum alloy having an insert 22 made of an impact resistant material, such as Ni-Resist cast iron, compatible to the aluminum alloy in its coefficient of thermal expansion and other properties cast into the upper portion of the piston and in which a top keystone-shaped ring groove 24 is machined to receive a top compression ring 25 of the split annulus type. Beneath the top ring groove 24, a second keystone-shaped ring groove 26 is machined in the aluminum alloy piston body to receive the second compression ring 27 also of the split annulus type. In some pistons, the insert 22 is enlarged such that the second ring groove 26 is also machined in the insert, apparently due to problems with pounding out the lower side of the groove 26. Although the invention disclosed herein could be employed with such an enlarged insert, it is not believed to be necessary since the invention reduces second ring pounding. Beneath the second ring groove 26, a third rectangular groove 28 is machined in the aluminum piston in which a conventional oil control ring 29 is received. It will be appreciated by those skilled in the art that the piston 21 contains an internal cavity (not shown) conventionally cooled by an oil jet spray, from which the top and second ring grooves 24 and 26 are isolated, the oil ring groove 28 customarily having small holes drilled into the cavity therefrom to permit the drainage of oil. Beneath the oil control ring groove 28, the piston comprises the customary skirt 30 for effecting the usual guiding fit of the piston with the walls of the cylinder 11. Although a trunk type piston has been described it will be evident that the invention will be equally applicable to slipper skirt and two-piece type pistons.

Considering the ring belt area of the piston 21 in greater detail, as shown in FIG. 2, it will be seen that the top land 31, that is the piston side wall intersecting the top side of the top ring groove 24, is set back to provide an oversize annular orifice between the head of the piston 21 and the cylinder wall 11 extending down to the upper side of the top compression ring 25. The amount of diametral clearance or set back of the top land 31 from the cylinder wall 11 is in general accordance with the principles taught in U.S. Pat. No. 3,463,057 to Packard, et al. which calls for a clearance of about 0.040 to 0.100 inches plus an additional amount to account for the thermal extension of the piston 21, the latter being about 0.0045 inches times the bore diameter for y-alloy aluminum pistons in the automotive size range. However, it is believed that when used in conjunction with the present invention, the top land diametral clearance need only be about 75% of the above stated values for most turbocharged engines and even less in naturally aspirated engines.

The second land 32 of the piston 21 is provided with an annular groove 34 for the purpose of altering the volume of the annulus 35 defined by the top ring 25, the second ring 27, the cylinder liner 11, and the second land 32 to produce a specific volume, the amount of which is empirically predetermined. Other methods of modifying the piston to produce the desired predetermined empirical volume of the annulus 35 may be used, such as varying the spacing between the top and second rings 25, 27 or varying the second land 32 to cylinder liner 11 clearance. However, since there is some indication that the shape of the second land annulus 35 may have some effect on its optimum volume for a given piston, it is recommended that only one of these methods of modifying that volume be used.

FIG. 4 is a graph illustrating the effect of changing the volume of the second land annulus 35 on the formation of hard carbon deposits on the top land 31 of the piston. As indicated in the above-mentioned Packard et al patent, it is known that the formation of hard carbon deposits on the top land of the piston bears a direct relationship to the oil control capability and durability of an automotive diesel engine, especially over long term operation thereof. The graph in FIG. 4 is based on a series of short term full load tests conducted on a single cylinder test engine of a given size. The volume of the second annulus was changed by varying the diameter of the groove 34 and all other variables were held substantially constant. The amount of hard carbon deposit formation is based on a visual inspection of the piston upon removal from the engine after test and rinsing of the loose materials therefrom. While this imparts some inaccuracy in the amount of carbon deposits, there was found to be excellent correlation between the results of long term multiple cylinder engines tests run at the optimum values for the volume of the annulus 35 determined from this curve and the second ring end clearance determined from the curve illustrated in FIG. 5. It will be seen from FIG. 4 that as the volume of the annulus 35 is increased, the amount of carbon deposits decreases until an optimum volume is reached and that a further increase in the annular volume from the optimum volume results in increased carbon deposit formation. The optimum volume of the annulus for the engine whose tests results are represented in FIG. 4 was 0.23 cubic inches. Thus, the optimum volume of the annulus 35 for any diesel engine in the automotive size can easily be determined by generating a curve similar to FIG. 4 in a series of short term single or multiple cylinder engine tests as described above and selecting a volume which produces a low level of carbon deposits. Specific engines of various sizes in the automotive range have been tested which produced very low or no carbon deposit formation in long term multiple cylinder tests where the volume of the annulus 35 was 0.15 cubic inches, 0.16 cubic inches, 0.18 cubic inches, 0.20 cubic inches, 0.23 cubic inches and 0.27 cubic inches. It is believed that the optimum volume of the annulus 35 for any diesel engine in the automotive size range will lie between about 0.12 cubic inches and about 0.35 cubic inches.

The top compression ring 25 is a conventional cast iron alloy, chromiumfaced piston ring of the split annulus type commonly used in automotive diesel engines and is keystone-shaped to fit the groove 24. In accordance with the art, the split annulus top ring 25 has an end clearance or compressed ring gap 36, which is measured in the cold state with the outside diameter compressed to the diameter of the bore the cylinder liner 11. For the top ring 25, the end clearance 36 is of conventional size, such as that recommended by the Society of Automotive Engineers in Standard No. SAE J929 "Piston Rings and Pistons" published in the SAE Handbook (1977 edition). The end clearance is generally sized to be as small as possible to minimize gas leakage therethrough while being large enough that, when the engine is at its maximum operating temperatures, the ring will not become solid which would cause scuffing of the ring and cylinder wall and ultimately an engine failure. A convenient rule of thumb for the minimum end clearance would be 0.0037 inches times the bore diameter.

Figure 5:
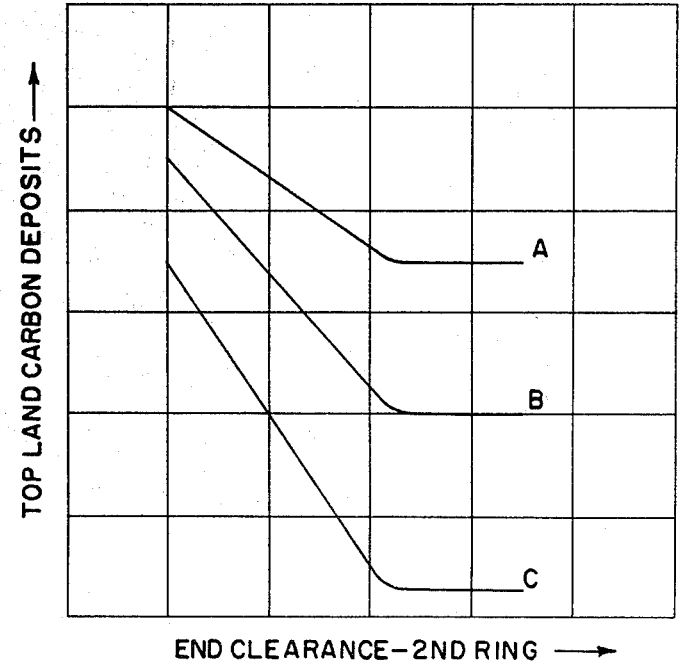
FIG. 5 is a graph illustrating the effect of varying the second compression ring end clearance of the piston assembly of FIG. 1 on the formation of hard carbon deposits on the top land of the piston.

The second compression ring 27 is also conventional except as noted hereinafter, being a cast iron alloy, chromium-faced, split-annulus piston ring also of keystone-shape to fit the ring groove 26 in the piston. However, in accordance with the invention, the cold end clearance 37 of the second ring 27 is considerably larger than the cold end clearance 36 of the top ring 25 as shown in exaggeration in FIG. 3. FIG. 5 is a graph of the effect of increasing the cold end clearance 37 of the second ring on the formation of carbon deposits on the top land 31 of the piston 21 while holding other variables constant. The three curves A, B, and C shown are for pistons having three different volumes of the annulus 35 and are based on a series of short term single cylinder engine tests as in the FIG. 4 graph. It will be seen that as the second ring end clearance 37 is increased, the formation of carbon deposits decreases until a minimum optimal end clearance (MOEC) is reached beyond which further increases in the second ring end clearance 37 have little or no effect on hard carbon deposit formation. It is further noted that the MOEC is roughly the same for each of the curves A, B and C which represent various volumes of the second land annulus 35. Accordingly, to achieve a minimum of carbon deposit formation, the end clearance 37 of the second ring 27 should be greater than the MOEC. For the specific engine illustrated, the MOEC is about 0.065 inches. Other engines have produced satisfactory results in long term tests wherein the nominal second ring end clearance 37 was about 0.063, 0.075, and 0.080 inches. The second ring end clearance may also be considered in terms of its ratio to the top ring end clearance which would tend to eliminate the effect of cylinder diameter when applying the invention to engines of different size. Based on a comparison of similar points in the tolerance range, it is believed that satisfactory results will be achieved in automotive diesel engines wherein the ratio of the second ring end clearance to the specified top ring end clearance is in excess of about 3 to 1. Although there does not appear to be a maximum limit to the second ring end clearance 37, it is known that as the second ring end clearance is increased, the blowby past the piston 21 into the engine crankcase increases. Since this is undesirable, it is recommended that the specified second ring end clearance not be much greater than is necessary to insure that the minimum tolerance of the ring will exceed the MOEC.

As will further be seen from FIG. 5, the combination of the optimum volume of the second land annulus 35 with a second ring end clearance 37 greater than the MOEC produces an optimum result which is greater than the sum of the effects of the two variables taken separately. That is, the differences between the leftward points of curves A and C, which represent changing the volume of the second land annulus 35 to the optimum while maintaining the second ring end clearance 37 at the prior art levels, plus the difference between the left and right end points of curve A, which represents increasing the end clearance while maintaining the volume of the second land annulus 35 at the prior art level, is considerably less than the difference between the leftward end of curve A, which is a prior art unmodified piston assembly, and the rightward end of curve C, which is an optimal piston assembly constructed in accordance with the present invention.

The improved results obtained through the use of the present invention are apparently due to the top ring 25 remaining sealed against the bottom side of the top ring groove 24 during substantially all of the engine expansion cycle. When combustion occurs, a certain mass of combustion gas leaks past the top ring 25 raising the pressure in the second land annulus 35. Since the pressure above the top ring rapidly decays during the initial portion of the down-travel of the piston, in prior art designs the pressure in the annulus 35 could exceed the pressure above the top ring and force it off its sealing surface. While the mechanism is not fully understood, apparently when the present invention is used, the increased volume of the second land annulus causes a substantial initial reduction in the pressure of the gas entering the annulus (assuming the mass of gas passing the top ring remains the same) and the increased second ring end clearance is an orifice which allows more of the pressure in the annulus 35 to be vented to the crankcase, the latter ocurring over an interval of time. The combined effect of changing these parameters apparently maintains the pressure in the second land annulus at a lower level than the pressure above the top ring during substantially all of the expansion cycle. It is also believed that too much volume in the second land annulus 35 would delay the pressure decay therein through the second ring end clearance to the point that the annulus pressure would exceed the pressure above the top ring near the end of the expansion stroke thereby lifting the top ring off its sealing surface. It is interesting to note however, that over a long term test, the groove 34 in the second land 32 can fill up with carbon without affecting the top land carbon deposit formation or oil control even though the volume of the second land annulus 32 is reduced. Apparently, a larger volume in the annulus 32 is necessary initially because the top ring 25, piston top groove 24, and cylinder wall 11 cannot be economically manufactured to produce perfect fits with each other thus allowing a larger mass of combustion gas to flow past the top ring. However, as the engine operates and these parts wear against each other, a better seal of the top ring 25 against the piston groove 24 and cylinder wall 11 is obtained and a smaller mass of combustion gas passes thereby so the additional volume created by the groove 34 is no longer necessary.

By way of example and not by way of limitation, a number of turbocharged automotive diesel engines were built with power cylinders constructed in accordance with the present invention, including the following specified cold dimensions and dimensional relationships:

Bore diameter: 4.300 inches
Top land diametral clearance: 0.070 inches
Top ring minimum end clearance: 0.016 inches
Second ring minimum end clearance: 0.065 inches
Second land annulus volume: 0.23 cubic inches
Ratio of second ring end clearance to top ring end clearance (actual): 3.0–4.5

Successful long term tests were run with these engines under various load conditions. During the conduct of these tests, the engines exhibited significantly improved oil consumption and oil contamination rates compared to tests of the same engines with prior art piston designs and little or no change in the lubricating oil consumption rate with increased operating time. Upon disassembly of the engines after various test intervals, it was found that the top lands of the pistons had significantly less and, in most cases, no hard carbon deposits. The top rings had virtually no wear on their top sides and wear of the second ring groove bottom side was substantially less than had been experienced with engines of this type with prior art piston designs.

Thus, it is apparent that there has been provided, in accordance with the invention, a diesel engine and piston assembly therefor that fully satisfies the objects, aims, and advantages set forth above. While the invention has been described in conjunction with specific embodiments thereof, it is evident that many alternatives, modifications and variations will be apparent to those in the light of the foregoing description. For example, while the compression rings are taught to be keystone-shaped, the invention could be utilized with other ring configurations. Accordingly, it is intended to embrace all such modifications as may fall within the scope of the appended claims.

What is claimed is:

1. In a four cycle diesel engine in the automotive size range and having a plurality of cylinders, each of said cylinders being closed on one end by a cylinder head and having a three ring reciprocating piston slidably received therein, said piston having an upper surface defining, with the closed end of the cylinder, a combustion chamber and having a periphery including a top land intersecting a top ring groove, a second ring receiving groove and a second land disposed between said top and second grooves, and an oil ring groove disposed below said second groove, a top split annular compression ring mounted in said top groove and having a cold end clearance, a second split annular compression ring mounted in said second groove and having a cold end clearance, and an oil control ring mounted in said oil ring groove, the improvement wherein said second ring cold end clearance is at least three times larger than said top ring cold end clearance, comparing equal points in the tolerance range for each ring, and the volume of the annulus defined by said compression rings, said cylinder and said second land being effective to achieve low carbon deposit formation on said piston top land during engine operation and being in the range from about 0.12 cubic inches to about 0.35 cubic inches.

2. The invention in accordance with claim 1 and the volume of the annulus being within the range of about 0.15 cubic inches to about 0.27 cubic inches.

3. The invention in accordance with claim 1 or 2 and the top land of said piston having an exaggerated clearance from said cylinder wall in an amount sufficient to inhibit the formation of hard carbon deposits on said top land.

4. The invention in accordance with claim 3 and the top land diametric clearance being at least about 0.030 inches plus an additional amount to compensate for thermal expansion of said piston.

5. In combination with an automotive diesel engine having a plurality of cylinders having a cylinder bore of about 4.3 inches in diameter, a piston assembly installed in each cylinder bore comprising a piston body having a top surface portion defining a combustion chamber and having a ring belt portion including alternating lands and grooves including a top land, a top ring groove, a second land, and a second ring groove, a top compression ring carried in said top groove and a second split annular compression ring carried in said second groove, said top and second compression rings, said piston second land, and said cylinder bore defining an annulus having a volume effective to achieve a low level of top land carbon deposit formation and being within the range of about 0.12 cubic inches to about 0.35 cubic inches, said second ring cold end clearance being greater than about 0.065 inches and being at least three times larger than the cold end clearance of said top compression ring.

6. In combination with an automotive diesel engine having a plurality of cylinders having a cylinder bore of about 4.3 inches in diameter, a piston assembly installed in each cylinder bore comprising a piston body having a top surface portion defining a combustion chamber and having a ring belt portion including alternating lands and grooves including a top land, a top ring groove, a second land, and a second ring groove, a top compression ring carried in said top groove and a second split annular compression ring carried in said second groove, said top and second compression rings, said piston second land, and said cylinder bore defining an annulus having a volume effective to achieve a low level of top land carbon deposit formation and being within the range of about 0.15 cubic inches to about 0.27 cubic inches, said second ring cold end clearance being greater than about 0.065 inches and being at least three times larger than the cold end clearance of said top compression ring.

7. In a turbocharged four cycle automotive diesel engine having a plurality of cylinders enclosed on one end and piston assemblies slidably mounted therein to define combustion chambers, each of said piston assemblies comprising a piston having a ring belt including top and second ring grooves separated by a second land and having a top land intersecting said top ring groove, said top land being set back to provide an exaggerated annular orifice with said cylinder, each of said piston assemblies further comprising a top compression ring mounted in said top groove and a second compression ring mounted in said second groove, said top and second rings being split annular rings having an end clearance, said top and second rings, said piston second land, and said cylinder defining a second land annulus, the improvement wherein said second ring cold end clearance is at least three times larger than the top ring cold end clearance and is sufficiently large relative to the top ring end clearance that the pressure in said annulus is below the pressure above said annulus throughout the expansion cycle of said engine and the volume of said second land annulus being effective to achieve a low level of carbon deposit formation on said top land and being within the range of 0.12 cubic inches to 0.35 cubic inches.

8. In a turbocharged four cycle automotive diesel engine having a plurality of cylinders enclosed on one end and piston assemblies slidably mounted therein to define combustion chambers, each of said piston assemblies comprising a piston having a ring belt including top and second ring grooves separated by a second land and having a top land intersecting said top ring groove, said top land being set back to provide an exaggerated annular orifice with said cylinder, each of said piston assemblies further comprising a top compression ring mounted in said top groove and a second compression ring mounted in said second groove, said top and second rings being split annular rings having an end clearance, said top and second rings, said piston second land, and said cylinder defining a second land annulus, the improvement wherein said second ring cold end clearance is at least three times larger than the top ring cold end clearance and is sufficiently large relative to the top ring end clearance that the pressure in said annulus is below the pressure above said annulus throughout the expansion cycle of said engine and the volume of said second land annulus being effective to achieve a low level of carbon deposit formation on said top land and being within the range of 0.15 cubic inches to 0.27 cubic inches.

9. The invention in accordance with claim 7 or claim 8 wherein the diametric clearance between said top land and said cylinder bore is at least about 0.030 inches plus an additional amount to compensate for thermal expansion of said piston.

* * * * *